(12) United States Patent
Gan

(10) Patent No.: US 6,478,390 B2
(45) Date of Patent: Nov. 12, 2002

(54) DRIVE BRACKET

(75) Inventor: Li Yuan Gan, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 21 days.

(21) Appl. No.: 09/745,048

(22) Filed: Dec. 20, 2000

(65) Prior Publication Data
US 2002/0043908 A1 Apr. 18, 2002

(30) Foreign Application Priority Data
Oct. 12, 2000 (TW) .................................. 089217694 U

(51) Int. Cl.$^7$ ................................................ H05K 5/00
(52) U.S. Cl. .................................... 312/223.2; 361/685
(58) Field of Search .......................... 312/223.1, 223.2, 312/319.1; 248/694; 292/87, 80; 361/683, 684, 685, 724, 725, 826, 827

(56) References Cited

U.S. PATENT DOCUMENTS

| | | | | | |
|---|---|---|---|---|---|
| 5,564,804 A | * | 10/1996 | Gonzalez et al. | ......... | 312/223.2 |
| 5,657,893 A | * | 8/1997 | Hitchings | .................. | 292/80 X |
| 5,717,571 A | * | 2/1998 | Helot | .......................... | 361/685 |
| 5,921,644 A | * | 7/1999 | Brunel et al. | ............. | 312/223.2 |
| 6,002,586 A | * | 12/1999 | Chen et al. | ........... | 312/223.2 X |
| 6,030,062 A | * | 2/2000 | Chen et al. | ................. | 32/223.2 |
| 6,099,098 A | * | 8/2000 | Leong | .................. | 312/223.2 X |
| 6,318,823 B1 | * | 11/2001 | Liao | ........................ | 312/223.2 |
| 6,341,072 B1 | * | 1/2002 | Liao | ..................... | 312/223.2 X |
| 6,351,376 B1 | * | 2/2002 | Liang et al. | ................. | 361/685 |
| 6,351,377 B1 | * | 2/2002 | Chao et al. | .................. | 361/685 |
| 6,351,378 B1 | * | 2/2002 | Chao et al. | .................. | 361/685 |

FOREIGN PATENT DOCUMENTS

| | | | | |
|---|---|---|---|---|
| JP | 03224021 | * | 10/1991 | .................. 361/685 |
| JP | 04148314 | * | 5/1992 | .................. 361/685 |

* cited by examiner

Primary Examiner—Lanna Mai
Assistant Examiner—Hanh V. Tran
(74) Attorney, Agent, or Firm—Wei Te Chung

(57) ABSTRACT

A drive bracket (10) comprises a body (12) and a resilient plate (14). The body includes a base (20), and two side walls (30) depending from respective opposite sides of the base. A pair of parallel shoulders (24) is formed on a top surface of the base, for engaging with a pair of complementary sills (134) of a computer enclosure (100). The resilient plate includes a fixing portion (40), a resilient pressing portion (50), and a resilient fixing portion (60). The resilient fixing portion has a handle (80) forming a fixing slot (84) therein. The resilient plate is attached to the top surface of the base. The fixing slot is adapted to resiliently engage with a fixing tab of a computer enclosure. A guiding lip (70) of the resilient pressing portion and the handle is adapted to resiliently abut a supporting board of the computer enclosure.

20 Claims, 5 Drawing Sheets

DRIVE BRACKET

BACKGROUND OF THE INVENTION

1. Field of the Invention

The present invention relates to a drive bracket, and in particular to a drive bracket which can be readily and securely attached to a computer enclosure.

2. Related Art

Data storage devices normally used in a personal computer include disk drives such as a hard disk drive (HDD), a floppy disk drive (FDD) and a compact disc read-only memory (CD-ROM) drive. A disk drive is often fixed to a receiving cage of a computer enclosure with bolts. When mounting, say, a HDD to the computer enclosure, a user must align the HDD with the receiving cage with one hand and then tighten the bolts with the other hand. This process is tedious and laborious. Therefore rails or long bent flanges are often attached to the HDD, to simplify the installation process.

Taiwan Patent Application No. 87204479 shows a conventional drive bracket. The bracket comprises a pair of bent flanges on a top surface thereof, for being slid into a pair of shoulders on a bottom surface of a receiving cage. However, the bracket is fixed to the receiving cage by screws. The process of tightening the screws is time-consuming and cumbersome. Furthermore, clearances exist between the bracket and the receiving cage, which renders the bracket prone to vibration.

Thus an improved drive bracket which overcomes the above-mentioned problems is desired.

SUMMARY OF THE INVENTION

Accordingly, an object of the present of invention is to provide a drive bracket which is readily and conveniently attached to a computer enclosure and detached therefrom.

Another object of the present invention is to provide a drive bracket for securely attaching a disk drive to a computer enclosure.

To achieve the above-mentioned objects, a drive bracket includes a body and a resilient plate. The body includes a base, and two side walls depending from respective opposite sides of the base. A pair of parallel shoulders is formed on a top surface of the base, for engaging with a pair of complementary sills of a computer enclosure. The resilient plate includes a fixing portion, a resilient pressing portion, and a resilient fixing portion. The resilient fixing portion has a handle forming a fixing slot therein. The resilient plate is attached to the top surface of the base by conventional means. The fixing slot is adapted to resiliently engage with a fixing tab of a computer enclosure. A guiding lip of the resilient pressing portion and the handle is adapted to resiliently abut a supporting board of the computer enclosure.

Other objects, advantages and novel features of the present invention will be drawn from the following preferred embodiment with attached drawings, in which:

DESCRIPTION OF THE PREFERRED EMBODIMENT

Figure 1:
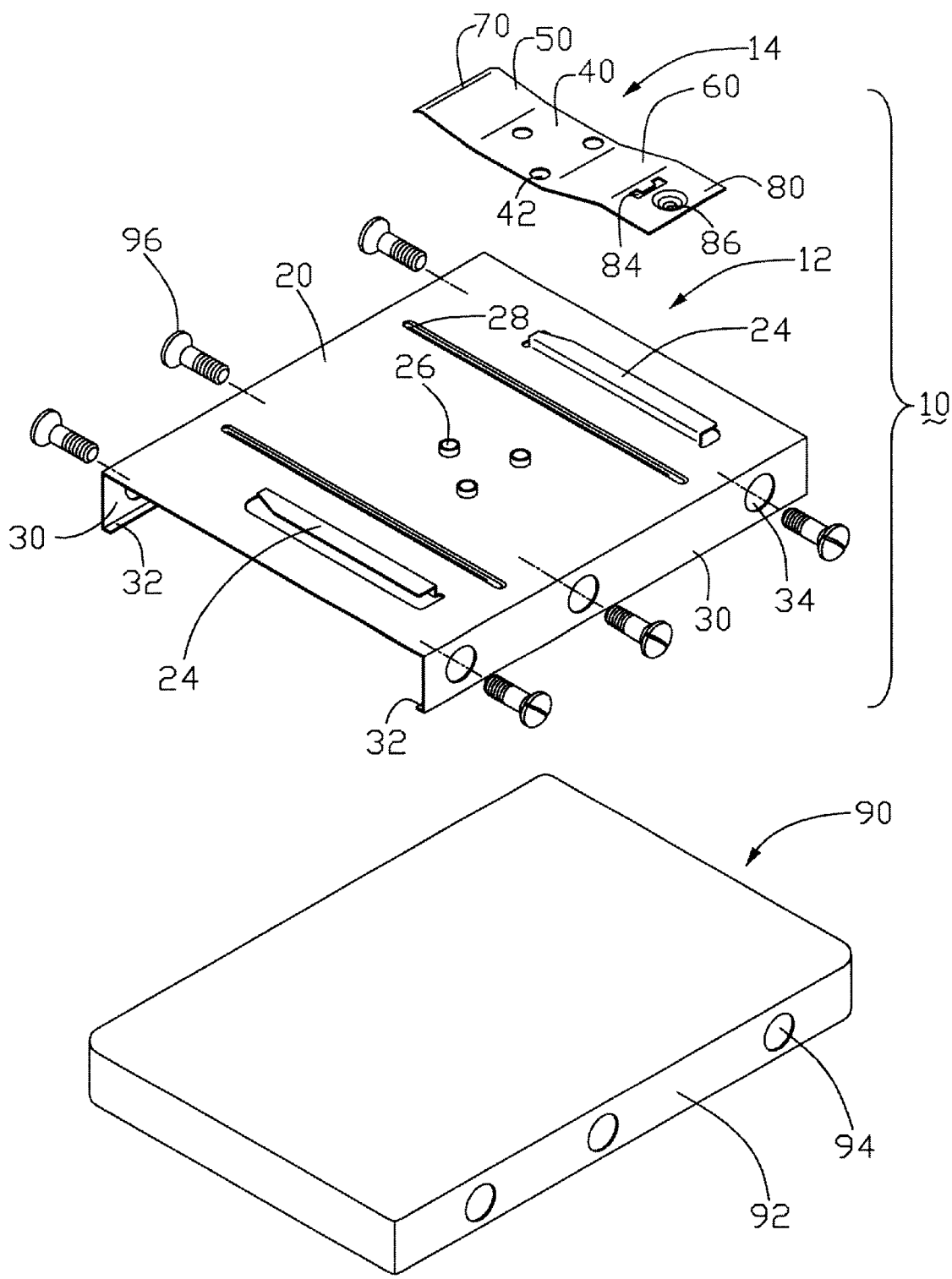
FIG. 1 is an exploded view of a drive bracket in accordance with the present invention together with a hard disk drive.

Referring to FIG. 1, a drive bracket 10 of the present invention includes a body 12 and a resilient plate 14. The body 12 includes a rectangular base 20, and two side walls 30 depending from respective opposite sides of the base 20, thereby defining a space (not labeled) for receiving a hard disk drive (HDD) 90 therein. Depending on a user's particular requirements, the body 12 can also receive a floppy disk drive, a CD-ROM drive, or other kinds of drives. Two opposing supporting flanges 32 extend inwardly from respective opposite side walls 30 of the body 12. A pair of L-shaped shoulders 24 extends upwardly and then perpendicularly outwardly near opposite ends of a top surface of the base 20. The shoulders 24 are parallel, and are aligned in a direction perpendicular to the side walls 30. Each shoulder 24 has a first vertical section extending upwardly from the base 20, and a second horizontal section bent outwardly from an upper end of the first section. A pair of parallel ribs 28 is formed on a bottom surface of the base 20, parallel to and between the shoulders 24. Three protrusions 26 extend upwardly from a center portion of the top surface of the base 20, between the ribs 28. The protrusions 26 are arranged in a triangle. Three through holes 34 are defined in each side wall 30, corresponding to screw holes 94 defined in lateral walls 92 of the HDD 90. Screws 96 are received in the screw holes 94 and the through holes 34.

The resilient plate 14 includes a fixing portion 40, and a resilient pressing portion 50 and a resilient fixing portion 60 extending outwardly and upwardly from respective opposite ends of the fixing portion 40. A guiding lip 70 extends outwardly and downwardly from a free end of the resilient pressing portion 50. A horizontal handle 80 is formed at an outermost section of the resilient fixing portion 60. Three apertures 42 are defined in the fixing portion 40, corresponding to the three protrusions 26 of the body 12. A recess 86 is formed in the handle 80, such that it protrudes below a lower surface of the handle 80. An U-shaped fixing slot 84 is defined near an inner end of the handle 80.

Figure 3:
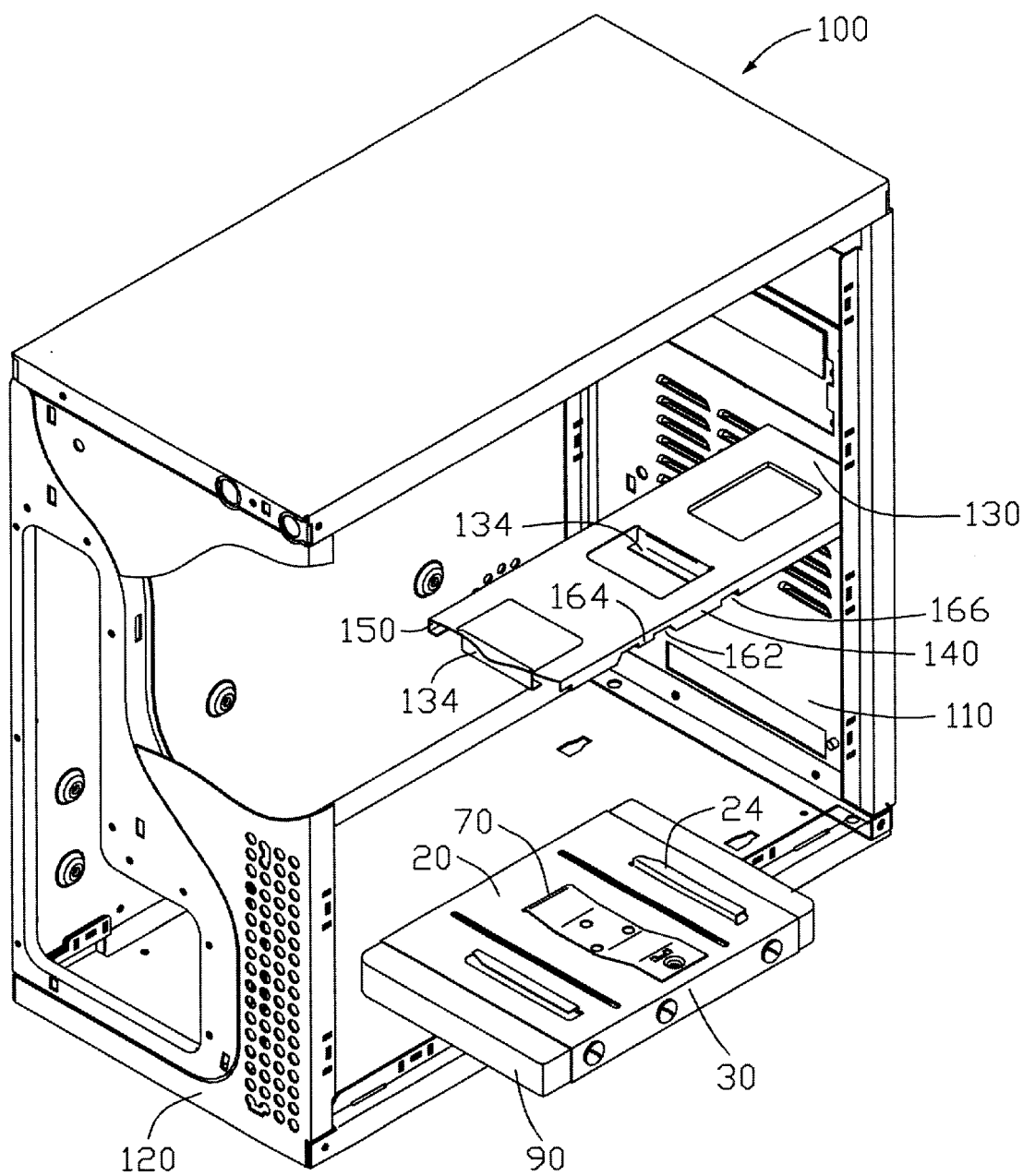
FIG. 3 is an exploded view of a computer enclosure and the drive bracket assembly to be attached to the computer enclosure.

Referring to FIG. 3, a computer enclosure 100 for receiving the disk drive bracket 10 comprises a front panel 110, a rear panel 120, and a supporting board 130 mounted between the front and rear panels 110, 120. A pair of parallel L-shaped sills 134 depends from the supporting board 130, for engagement with the shoulders 24 of the body 12. The sills 134 are opposed to each other, and are aligned in a direction parallel to the front panel 110. Each sill 134 has a first vertical section depending from the supporting board 130, and a second horizontal section bent inwardly from a lower end of the first section. A first flange 140 depends from an outer lateral edge of the supporting board 130. A second flange 150 depends from an inner lateral edge of the supporting board 130, opposite the first flange 140. A pair of trapeziform cutouts 162 is defined in the first flange 140, between the sills 134. Thus the first flange 140 forms a fixing tab 164 which separates the two trapeziform cutouts 162. A pair of slits 166 is defined in the first flange 140, corresponding to the sills 134 of the supporting board 130.

Figure 2:
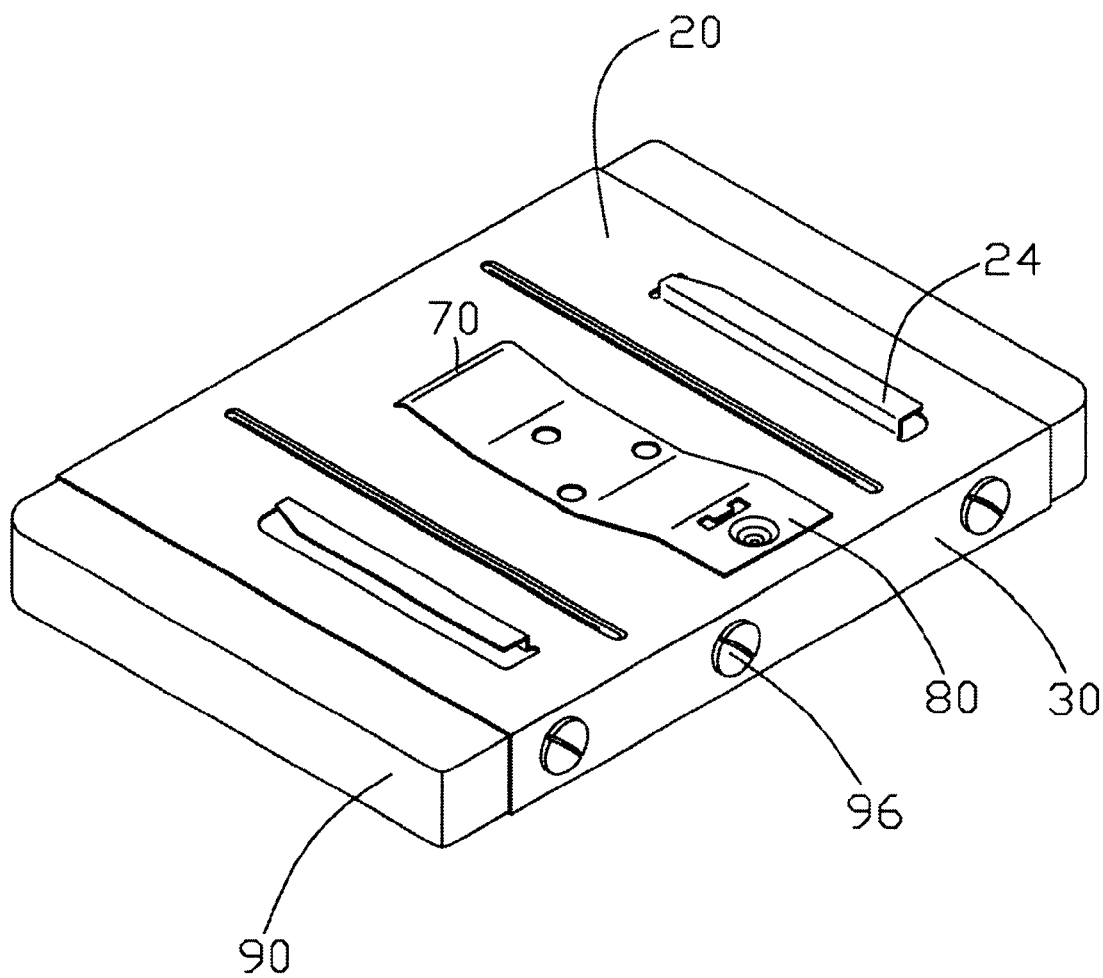
FIG. 2 is an assembled view of FIG. 1.

Referring to FIGS. 1 and 2, in pre-assembly, the fixing portion 40 of the resilient plate 14 is placed on the base 20 of the body 12. The protrusions 26 of the body 12 extend into the through holes 42 of the resilient plate 14. The resilient plate 14 is then attached to the top surface of the base 20 by conventional means. The guiding lip 70 of the resilient pressing portion 50 and the handle 80 of the resilient fixing portion 60 of the resilient plate 14 are still separated from the top surface of the base 20, to provide space for elastic deformation of the guiding lip 70 and the handle 80. Then the HDD 90 is slid into the receiving space (not labeled) of the body 12 along the supporting flanges 32. The ribs 28 of the body 12 abut a top surface of the HDD 90, and the side walls 30 of the body 12 abut the lateral walls 92 of the HDD 90. The screws 96 are extended through the through holes 34 of the body 12 to engage with the screw holes 94 of the HDD 90. Thus the HDD 90 is firmly secured to the body 12.

Figure 4:
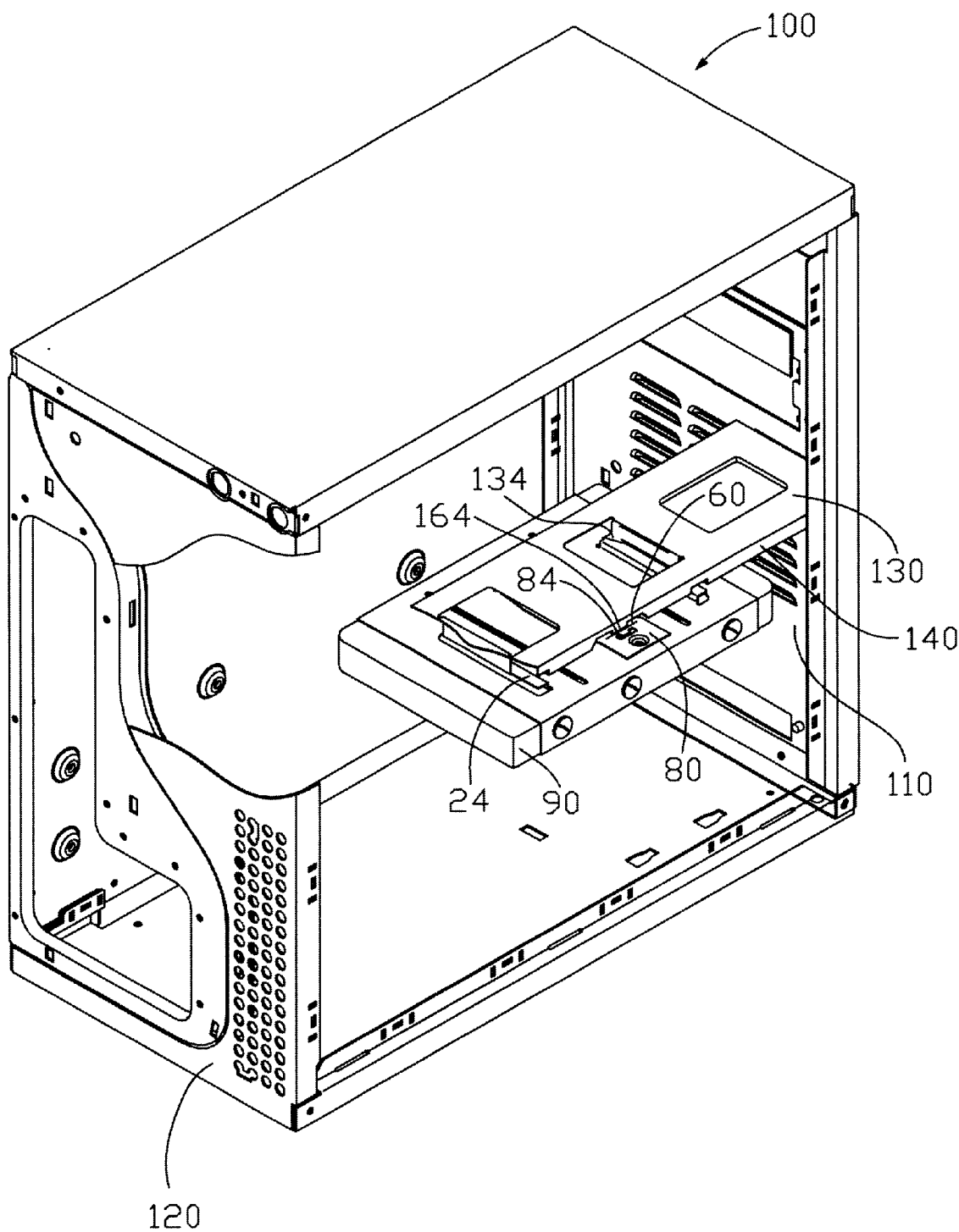
FIG. 4 is a partly assembled view of FIG. 3.
Figure 5:
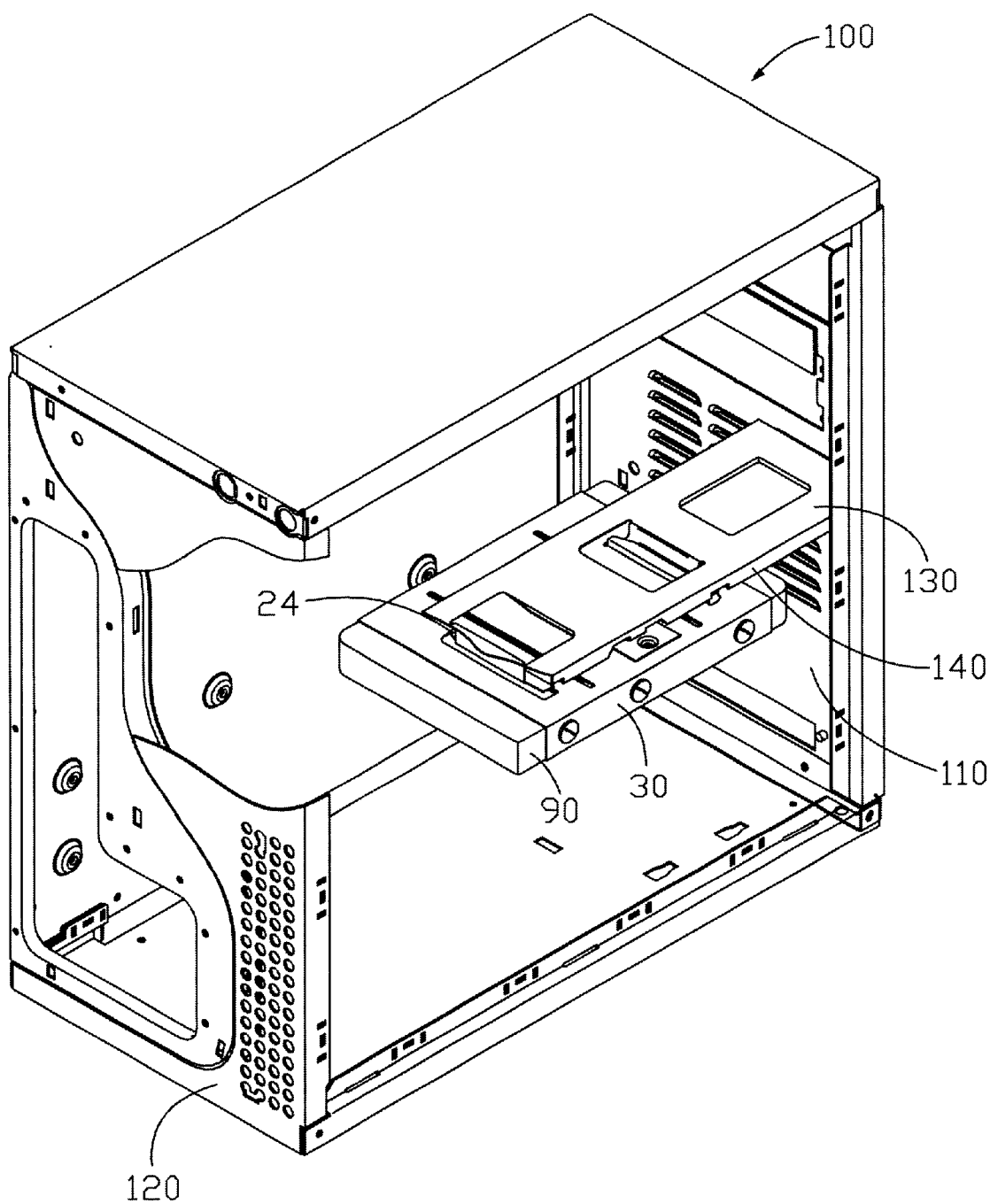
FIG. 5 is a completely assembled view of FIG. 3.

Referring also to FIGS. 3–5, in assembly, the disk drive bracket 10 is installed in the computer enclosure 100. The shoulders 24 of the disk drive bracket 10 are passed through the respective slits 166 of the enclosure 100. As the drive bracket 10 is progressively pushed inwardly, the resilient fixing portion 60 of the resilient plate 14 contacts the fixing tab 164 of the enclosure 100. The resilient fixing portion 60 elastically deforms downwardly. The drive bracket 10 is pushed further inwardly until the fixing tab 164 of the enclosure 100 snaps into the fixing slot 84 of the resilient plate 14. The guiding lip 70 of the resilient pressing portion 50 and the handle 80 of the resilient fixing portion thereby resiliently presses against a bottom surface of the supporting board 130 of the enclosure 100. Thus the drive bracket 10 is firmly attached to the enclosure 100, and is prevented from shifting when subjected to vibration or shock during normal operation.

In disassembly, the recess 86 of the resilient plate 14 is depressed until the fixing tab 164 of the enclosure 100 disengages from the fixing slot 84 of the resilient plate 14. Then the drive bracket 10 is slid out from the enclosure 100.

It is understood that the invention may be embodied in other forms without departing from the spirit thereof. Thus, the present example and embodiment are to be considered in all respects illustrative and not restrictive, and the invention is not to be limited to the details given herein.

What is claimed is:

1. A drive bracket comprising:
   a body comprising a base and two side walls depending from respective opposite sides of the base, a pair of L-shaped opposing shoulders being formed on a top surface of the base adapted to engage with a computer enclosure; and
   a resilient plate comprising a fixing portion attached to the top surface of the base of the body, a resilient fixing portion extending from one end of the fixing portion, the resilient fixing portion defining a fixing slot therein adapted to snappingly engage with the computer enclosure.

2. The drive bracket as described in claim 1, wherein each of the shoulders comprises a first section extending upwardly from the body and a second section extending perpendicularly from a distal end of the first section, thereby forming the L-shaped profile.

3. The drive bracket as described in claim 1, wherein at least one aperture is defined in the fixing portion of the resilient plate, and at lease one protrusion is formed on the base of the body for engaging with the aperture, thereby securing the resilient plate to the body.

4. The drive bracket as described in claim 1, wherein the fixing slot of the resilient fixing portion is U-shaped.

5. The drive bracket as described in claim 1, wherein a resilient pressing portion extends from another end of the fixing portion.

6. The drive bracket as described in claim 5, wherein a guiding lip is formed at a free end of the resilient pressing portion, adapted for pressing the computer enclosure.

7. The drive bracket as described in claim 1, wherein the resilient fixing portion further comprises a handle, and at least one recess formed thereon for facilitating manual operation.

8. The drive bracket as described in claim 1, wherein two opposing supporting flanges extend inwardly from respective opposite side walls of the body.

9. The drive bracket as described in claim 1, wherein each side wall of the body defines at least one through hole therein.

10. The drive bracket as described in claim 1, wherein at least one rib is formed on the body.

11. A computer enclosure comprising:
    a supporting board having a pair of sills extending downwardly therefrom, and at least one fixing tab extending downwardly from the supporting board; and
    a drive bracket comprising a body and a resilient plate attached to the body, the body upwardly forming a pair of opposing shoulders for engaging with the sills of the supporting board, the resilient plate having a resilient fixing portion defining at least one fixing slot for engaging with the at least one fixing tab of the supporting board.

12. The drive bracket assembly as described in claim 11, wherein a flange depends from the supporting board, at least two cutouts are defined in the flange thereby forming the at least one fixing tab.

13. The drive bracket assembly as described in claim 12, wherein the flange of the supporting board defines a pair of slits corresponding to the sills of the supporting board, for facilitating entry of the shoulders of the body into the enclosure.

14. The drive bracket assembly as described in claim 11, wherein each of the shoulders of the body comprises a first section extending upwardly from the body and a second section extending from the first section thereby forming an L-shaped profile, and wherein each of the sills of the supporting board forms a complementary L-shaped profile for slidably engaging with the corresponding shoulder.

15. The drive bracket assembly as described in claim 11, wherein at least one aperture is defined in the resilient plate, and at least one protrusion is formed on the body for engaging with the at least one aperture, thereby securing the resilient plate to the body.

16. The drive bracket assembly as described in claim 11, wherein the resilient plate further comprises a resilient pressing portion, and wherein a guiding lip is formed at a free end of the resilient pressing portion, for pressing a bottom surface of the supporting board.

17. The drive bracket assembly as described in claim 11, wherein the resilient fixing portion further comprises a handle, and at least one recess formed thereon, for facilitating manual operation.

18. A drive bracket comprising:
    a body adapted to receive a data storage device, and having a pair of opposing engaging plates adapted to slidably engage with a computer enclosure; and
    a resilient plate comprising a fixing portion attached to a top surface of the body, a resilient pressing portion extending from one end of the fixing portion, and a resilient fixing portion extending from an opposite end of the fixing portion, the resilient pressing portion being adapted to resiliently abut against the computer enclosure, the resilient fixing portion defining at least one fixing slot adapted for snappingly engaging with the computer enclosure.

19. The drive bracket as described in claim 18, wherein an arcuate guiding lip of the resilient pressing portion contacts the enclosure.

20. The drive bracket as described in claim 18, wherein the resilient fixing portion further comprises a handle extending from a free end of the resilient fixing portion.

* * * * *